July 23, 1968  C. H. GEARY  3,393,692
ROTARY SHAFT SPEED CONTROL
Filed Oct. 22, 1965
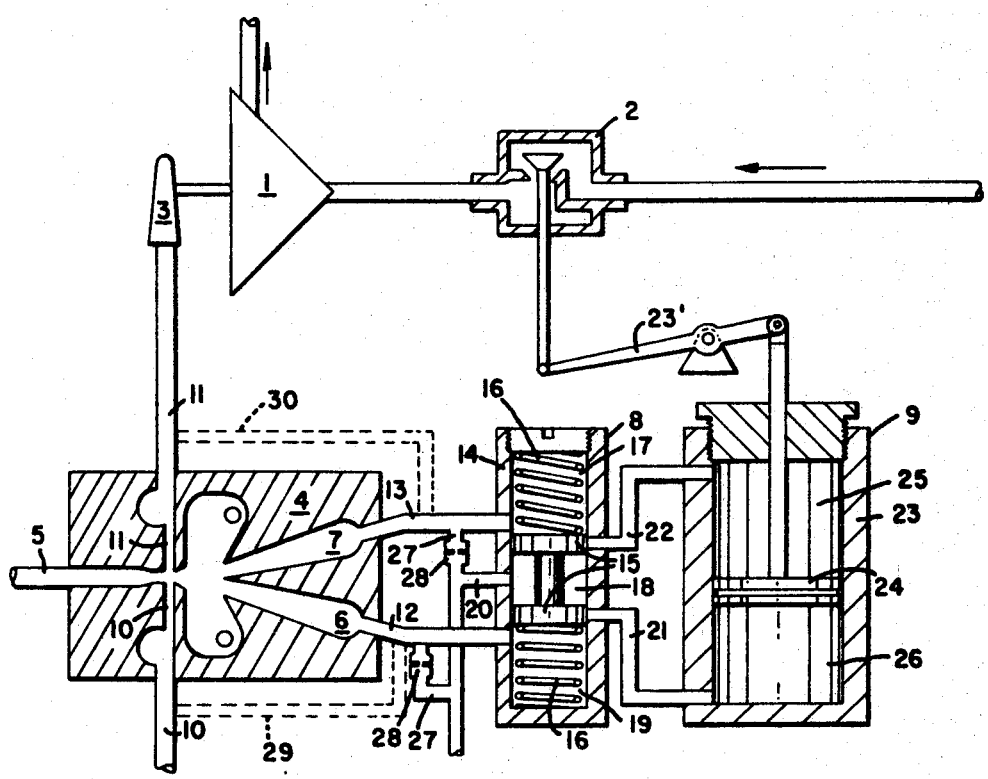
INVENTOR.
CARL H. GEARY.
BY *J. Raymond Curtin*
ATTORNEY.

United States Patent Office 3,393,692
Patented July 23, 1968

3,393,692
ROTARY SHAFT SPEED CONTROL
Carl H. Geary, Irwin, Pa., assignor to Carrier Corporation, Syracuse, N.Y., a corporation of Delaware
Filed Oct. 22, 1965, Ser. No. 500,913
1 Claim. (Cl. 137—36)

ABSTRACT OF THE DISCLOSURE

A turbine speed governor incorporating a fluid amplifier having a constant pressure control input proportional to the desired speed and a variable pressure control input provided by a hydraulic pump driven directly by the turbine shaft.

---

This invention relates broadly to rotating shaft machinery and more particularly to a shaft speed control. Still more particularly, this invention relates to a shaft speed governor employing a fluid amplifier.

Present shaft speed governors are quite complex and incorporate a large number of parts. This results in an expensive speed control which is quite sensitive to minor defects or wear in any of the elements of the control system.

It is therefore an object of this invention to provide a simple, accurate and inexpensive shaft speed governor.

It is a further object of this invention to provide a shaft speed governor employing a fluid flow regulator known as a fluid amplifier to control shaft speed.

It is another object of this invention to provide a method for controlling the shaft speed of a rotary machine.

In accomplishing the objects of this invention, there is provided a shaft speed governor comprising a high pressure fluid amplifier operable in response to a pressure differential between a regulated, low pressure fluid and a fluid pressure which varies as a function of turbine speed. The high pressure fluid from the fluid amplifier operates the main circuit of the rotating shaft machine to maintain the shaft at a constant speed.

Other objects and features of this invention will be apparent from a consideration of the ensuing specification and drawing in which:

The figure is a schematic diagram of the control system forming the subject of this invention.

Referring more particularly to the drawing there is shown a steam turbine 1 to provide power at a constant speed under varying loads to a rotary machine much as a compressor or generator (not shown). To maintain the desired speed, steam flow from a main source (not shown) to the turbine is regulated by valve 2. Valve 2 is operable in response to the fluid governor control system forming the subject of this invention. The main element of this system is a fluid amplifier 4 having a power fluid input duct 5 for receiving a high pressure power fluid from any suitable source (not shown). By selectively deflecting this power fluid into discharge duct 6 or discharge duct 7 in fluid amplifier 4, the pilot valve 8 and servomotor 9 are actuated to vary the opening of steam valve 2.

A very simple arrangement is provided to deflect the aforementioned power fluid. A regulated, low pressure control fluid representing a design speed condition is received in duct 10 of amplifier 4 which tends to deflect the power fluid into duct 7. A variable pressure control fluid, received in duct 11 of amplifier 4 in opposition to the regulated low pressure fluid received in duct 10, tends to deflect the power fluid into duct 6. The variable pressure control fluid is provided by an oil pump 3 driven by the steam turbine shaft. Thus if the shaft speeds up or slows down, fluid pressure provided by the pump will increase or decrease.

A pilot valve assembly 8 is connected to output ducts 6 and 7 of amplifier 4 through high pressure lines 12 and 13. Pilot valve assembly 8 comprises housing 14 having a double piston 15 therein. Piston 15 is biased to a central position within housing 14 by opposing springs 16. The housing 14 and the piston 15 define an upper chamber 17, a central chamber 18, and a lower chamber 19. High pressure line 13 is received in chamber 17, high pressure line 12 is received in chamber 19, and chamber 18 is vented through line 20 to the oil sump (not shown). Housing 14 also has therein ducts 21 and 22 so positioned that when piston 15 is displaced upward, duct 21 is in communication with chamber 19, and duct 22 is in communication with chamber 18. When piston 15 is displaced downward, duct 22 is in communication with chamber 17 and duct 21 is in communication with chamber 18.

A servomotor assembly 9 is in communication with ducts 21 and 22. Servomotor assembly 9 comprises housing 23 having a piston 24 therein operably connected to steam valve 2 through linkage 23' so that a movement of piston 24 will vary the setting of valve 2. Pilot valve duct 22 is in communication with the upper chamber 25 of servomotor assembly 9 formed by housing 23 and piston 24. Pilot valve duct 21 is in communication with lower chamber 26 of servomotor assembly 9 formed by housing 23 and piston 24.

Bleed lines 27 having restrictive orifices 28 therein are provided in high pressure lines 12 and 13 to provide constant flow through lines 12 and 13 irrespective of the position of piston 15 so that amplifier ducts 6 and 7 do not "load up" and destroy the effectiveness of fluid amplifier 4.

A feedback loop to reduce or extend system reaction time may be applied to this control system as illustrated by dotted fluid lines 29 and 30.

Considering the operation of this control system at start-up, high pressure fluid in duct 5 is deflected by the regulated low pressure fluid in duct 10 through duct 7 into line 13. The high pressure fluid displaces pilot valve piston 15 downward, allowing high pressure into line 22, causing servomotor piston 24 to move downward, opening steam valve 2 to provide steam to the turbine. As turbine 1 accelerates, oil pump 3 builds up fluid pressure in duct 11 which tends to deflect high pressure fluid from duct 5 through duct 6 into line 12. When fluid pressure in duct 11 equals the pressure in duct 10, high pressure supply fluid from duct 5 will be deflected evenly through ducts 6 and 7 into fluid lines 12 and 13 causing pilot valve piston 15 to assume an equilibrium position which in turn moves servomotor piston 24 to an equilibrium position. This holds steam valve 2 in a position that will maintain turbine 1 at the desired speed. If the turbine speed varies due to load variations or steam supply pressure variations, the control system will react in a manner as described above to open or close steam valve 2 to maintain turbine 1 at the proper speed.

While I have described a preferred embodiment of my invention, it will be understood that the invention may be otherwise embodied within the scope of the following claim.

I claim:
1. A fluid amplifier speed control for a rotary machine shaft comprising:
    a fluid amplifier, said amplifier having a power fluid input duct, a first and a second power fluid output duct and a first and a second control fluid input duct,
    a power fluid source, communicating with said power fluid input duct,
    an oil pump operably connected to the machine shaft to provide a variable pressure control fluid proportional to the speed of the machine shaft, the variable pressure control fluid being provided to the fiirst control fluid input duct, a constant pressure control fluid source, the constant pressure being equal to that produced by said oil pump when the machine shaft is rotated at the desired speed; the constant pressure control fluid being provided to the second control fluid input duct, the resultant momentum of said control fluids being operable to divert said power fluid out one of the two said power output ducts, a pilot valve assembly comprising a pilot valve housing having a first and a second power fluid input duct and a first and second power fluid output duct, a pilot valve movably disposed within said housing operable in response to the amount of power fluid entering said first and second input ducts of said pilot valve to divert said power fluid out said first or second power fluid output duct of said pilot valve or to completely block said output ducts, a servomotor assembly comprising a housing having an inlet at both ends thereof; one of said inlets communicating with the first pilot valve power fluid output duct, the other inlet communicating with the second pilot valve output duct, a piston disposed in said servomotor housing between the inlets thereof for movement in response to the fluid supplied thereto from said pilot valve, a motive fluid valve operably associated with the rotary machine for controlling the power input thereto, said servomotor piston being operably connected to said motive fluid valve so that movement of said piston effects change in the quantity of motive fluid supplied to the machine to regulate the speed thereof.

References Cited

UNITED STATES PATENTS

| | | | |
|---|---|---|---|
| 1,959,889 | 5/1934 | Wunsch | 137—81.5 X |
| 2,858,700 | 11/1958 | Rose | 137—37 X |
| 3,181,546 | 5/1965 | Boothe | 137—81.5 |
| 3,233,522 | 2/1966 | Stern | 137—36 X |
| 3,248,043 | 4/1966 | Taplin | 60—39.28 X |

FOREIGN PATENTS 587,895   5/1947   Great Britain.

CLARENCE R. GORDON, *Primary Examiner.*